(12) United States Patent
Shimada et al.

(10) Patent No.: US 6,395,821 B1
(45) Date of Patent: May 28, 2002

(54) WATER-DISPERSIBLE WATER-AND-OIL REPELLANT COMPOSITION

(75) Inventors: Toyomichi Shimada; Takashige Maekawa, both of Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/701,368

(22) PCT Filed: Mar. 29, 2000

(86) PCT No.: PCT/JP00/01972

§ 371 (c)(1),
(2), (4) Date: Nov. 29, 2000

(87) PCT Pub. No.: WO00/58416

PCT Pub. Date: Oct. 5, 2000

(30) Foreign Application Priority Data

Mar. 29, 1999 (JP) .............................................. 11-86704

(51) Int. Cl.⁷ .......................... C08L 27/12; B32B 27/00
(52) U.S. Cl. ...................... 524/520; 524/544; 526/245; 525/374; 525/375; 428/375
(58) Field of Search ................................ 524/520, 544; 526/245; 525/374, 375; 428/375

(56) References Cited

U.S. PATENT DOCUMENTS

| 4,834,764 A | | 5/1989 | Derner et al. |
|---|---|---|---|
| 5,346,949 A | * | 9/1994 | Fukazawa et al. |
| 5,688,309 A | | 11/1997 | Shimada et al. |
| 5,919,527 A | * | 7/1999 | Fitzgerald et al. |
| 5,929,158 A | * | 7/1999 | Matsuno et al. |
| 6,177,531 B1 | | 1/2001 | Shimada et al. |
| 6,207,777 B1 | * | 3/2001 | Shimada et al. |
| 6,251,984 B1 | * | 6/2001 | Shimada et al. |

FOREIGN PATENT DOCUMENTS

| JP | 48-4528 | 1/1973 |
|---|---|---|
| JP | 60-151378 | 8/1985 |
| JP | 61-19684 | 1/1986 |
| JP | 4-82971 | 3/1992 |
| JP | 5-179573 | 7/1993 |
| JP | 5-272060 | 10/1993 |
| JP | 8-259877 | 10/1996 |
| JP | 62-16454 | 1/1997 |

* cited by examiner

*Primary Examiner*—Tae H. Yoon
(74) *Attorney, Agent, or Firm*—Oblon, Spivak, McClelland, Maier & Neustadt, P.C.

(57) ABSTRACT

The invention relates to a water dispersion type water and oil repellent composition which satisfies both repeated washing durability of water and oil repellency and durability of hydrostatic pressure resistance. A water dispersion type water and oil repellent composition comprising (A) a fluorine-containing copolymer having hydroxy groups, (B) a fluorine-containing copolymer having epoxy groups, (C) a compound having a blocked isocyanate group and having no carbon-carbon unsaturated bond and (D) an amino resin, as effective components.

5 Claims, No Drawings

WATER-DISPERSIBLE WATER-AND-OIL REPELLANT COMPOSITION

TECHNICAL FIELD

The present invention relates to a water dispersion type water and oil repellent composition.

BACKGROUND ART

Heretofore, it has been known that a polymer having polymer units based on a polymerizable monomer having a polyfluoroalkyl group (hereinafter referred to as a $R^f$ group), exhibits water and oil repellency. And it has been known that water and oil repellency can be imparted to the surface of a fiber, etc. by treating the fiber, etc. with a water and oil repellent composition containing such a polymer.

In recent years, the application of the water and oil repellent treatment has been expanded to such outdoor fields as sports wears and mountaineering wears. In the outdoor fields, better water and oil repellency is desired.

Further, the durability of water and oil repellency against repeated washing or the durability of hydrostatic pressure resistance of fabric is used as a practical index showing the durability of water and oil repellency. And, the water and oil repellent composition is recommended to be in the form of an aqueous dispersion from the viewpoint of a problem of working environment or a problem of the influence over the environment.

The following cases may be mentioned as methods for solving the above problems and giving durability against repeated washing.

A method of applying an aqueous dispersion of a fluorine-containing copolymer together with a water-soluble amino resin such as an N-methylol-modified melamine resin. A method of applying a fluorine-containing copolymer together with an isocyanate compound (JP-A-56-165072, JP-A-61-19684). A method of treating with an aqueous dispersion containing a fluorine-containing copolymer having isocyanate groups and hydroxyl groups and a blocked isocyanate compound (U.S. Pat. No. 4,834,764)

However, the above methods have had a problem that the durability of water and oil repellency against repeated washing is not sufficient, or a problem that the durability of hydrostatic pressure resistance is not sufficient. Further, for application to fibers, it is not desirable to use the combined resin such as the water-soluble amino resin or the blocked isocyanate compound in a large amount for the purpose of improving the hydrostatic pressure resistance, because such a combined resin tends to harden the hand and feel of the fibers or to impair the air permeability which the fibers inherently have.

An object of the present invention is to provide a water dispersion type water and oil repellent composition which satisfies both repeated washing durability of water and oil repellency and durability of hydrostatic pressure resistance.

DISCUSSION OF THE INVENTION

The present invention is a water dispersion type water and oil repellent composition comprising the following copolymer (A), the following copolymer (B), the following compound (C) and an amino resin (D):

Copolymer (A): a copolymer having polymer units based on a polymerizable monomer having a hydroxyl group and polymer units based on a polymerizable monomer having a polyfluoroalkyl group;

Copolymer (B): a copolymer having polymer units based on a polymerizable monomer having an epoxy group and polymer units based on a polymerizable monomer having a polyfluoroalkyl group; and Compound (C): a compound having a blocked isocyanate group and no polymerizable carbon-carbon unsaturated bond.

BEST MODE FOR CARRYING OUT THE INVENTION

In this specification, acrylic acid and metacrylic acid are generally referred to as (meth)acrylic acid. The same applies also to a representation by a (meth)acrylate or the like.

The water dispersion type water and oil repellent composition of the present invention comprises the copolymer (A) and the copolymer (B). The copolymer (A) and the copolymer (B) respectively have polymer units based on a polymerizable monomer (hereinafter referred to also as a monomer (f)) having a polyfluoroalkyl group. As the monomer (f), a (meth)acrylate having a $R^f$ group is preferred. The (meth)acrylate having a $R^f$ group is a compound wherein a $R^f$ group is present in the alcohol residue moiety of a (meth)acrylic acid ester.

The $R^f$ group is a group having at least two hydrogen atoms of an alkyl group substituted by fluorine atoms. The carbon number of the $R^f$ group is preferably from 2 to 20, particularly preferably from 6 to 16. Further, the $R^f$ group may have a straight chain structure or a branched structure, preferably a straight chain structure. In the case of a branched structure, it is preferred that the branched moiety is present at the terminal portion of the $R^f$ group, and it is a short chain with a carbon number of from about 1 to 4. The $R^f$ group may contain a halogen atom other than a fluorine atom. The halogen atom other than the fluorine atom is preferably a chlorine atom.

The structure of the terminal moiety of the $R^f$ group may, for example, be $—CF_2CF_3$, $—CF(CF_3)_2$, $—CF_2H$, $—CFH_2$, or $—CF_2Cl$, preferably $—CF_2CF_3$. Further, an etheric oxygen atom or a thioetheric sulfur atom may be inserted between a carbon-carbon bond in the $R^f$ group.

The number of fluorine atoms in the $R^f$ group is preferably at least 60%, particularly preferably at least 80%, when it is represented by [(number of fluorine atoms in the $R^f$ group)/(number of hydrogen atoms contained in an alkyl group having the same carbon number as in the $R^f$ group)]×1000 (%). Further, the $R^f$ group is preferably a group having all hydrogen atoms in an alkyl group substituted by fluorine atoms, i.e. a perfluoroalkyl group (hereinafter referred to as a $R^F$ group), or a group having a $R^F$ group at the terminal portion.

The carbon number of the $R^F$ group is preferably from 2 to 20, particularly preferably from 6 to 16. If the carbon number is less than 2, the water and oil repellency tends to be low. If the carbon number exceeds 20, the copolymer tends to be solid at room temperature, and the sublimation property tends to increase, whereby handling tends to be difficult.

Specific examples for the $R^f$ group will be given below. The following examples include "structurally isomeric groups" which are groups different in the structure, having the same molecular formula.

$C_4F_9—$ [$F(CF_2)_4—$, $(CF_3)_2CFCF_2—$ or $(CF_3)_3C—$], $C_5F_{11}—$ [such as $F(CF_2)_5—$ or $(CF_3)_3CCF_2—$], $C_6F_{13}—$ [such as $F(CF_2)_6—$, $C_7F_{15}—$, $C_8H_{17}—$, $C_9F_{19}—$, $C_{10}F_{21}—$, $Cl(CF_2)_s—$ (s is an integer of from 2 to 16), $H(CF_2)_t—$ (t is an integer of from 1 to 16), $(CF_3)_2CF(CF_2)_y-$ (y is an integer of from 1 to 14), etc.

Specific examples will be given below wherein the $R^f$ group is a group having an etheric oxygen atom or a thioetheric sulfur atom inserted between a carbon-carbon bond.

$F(CF_2)_5OCF(CF_3)-$, $F[CF(CF_3)CF_2O]_rCF(CF_3)CF_2CF_2-$, $F[CF(CF_3)CF_2O]_zCF(CF_3)-$, $F[CF(CF_3)CF_2O]_uCF_2CF_2-$, $F(CF_2CF_2CF_2O)_vCF_2CF_2-$, $F(CF_2CF_2O)_wCF_2CF_2-$ (r is an integer of from 1 to 6, z is an integer of from 1 to 5, u is an integer of from 2 to 6, v is an integer of from 1 to 6, and w is an integer of from 1 to 9), etc.

As the (meth)acrylate having a $R^2$ group, a compound represented by the following formula 1 is preferred. However, in the formula 1, $R^f$ is a $R^f$ group, Q is a bivalent organic group, and $R^1$ is a hydrogen atom or a methyl group.

$R^f-Q-OCOCR^1=CH_2$  Formula 1

The $R^f$ group in the formula 1 is preferably a $R^f$ group containing no etheric oxygen atom or no thioetheric sulfur atom, particularly preferably a $R^F$ group. Especially preferred is a group represented by $-(CF_2)_nF$ (wherein n is an integer of from 2 to 20), and n is preferably an integer of from 5 to 17. Particularly preferred is a group wherein n is an integer of from 7 to 13.

Q in the Formula 1 may, for example, be preferably $-(CH_2)_{p+q}-$, $-(CH_2)_pCONH(CH_2)_q-$, $-(CH_2)_pOCONH(CH_2)_q-$, $-(CH_2)_pSO_2NR^2(CH_2)_q-$, $-(CH_2)_pNHCONH(CH_2)_q-$ or $-(CH_2)_pCH(OH)-(CH_2)_q-$, wherein $R^2$ is a hydrogen atom or an alkyl group, and each of p and q is an integer of at least 0, provided that p+q is an integer of from 1 to 22. Among them, preferred is $-(CH_2)_{p+q}-$, $-(CH_2)_pCONH(CH_2)_q-$ or $-(CH_2)_pSO_2NR^2(CH_2)_q-$, wherein q is an integer of at least 2, and p+q is from 2 to 6. Particularly preferred is $-(CH_2)_{p+q}-$, wherein p+q is from 2 to 6, i.e. a dimethylene group to a hexamethylene group. It is preferred that a fluorine atom is bonded to the carbon atom of $R^f$ bonded to Q.

The following compounds may be mentioned as specific examples of the (meth)acrylate having a $R^f$ group, wherein $R^1$ is a hydrogen atom or a methyl group.

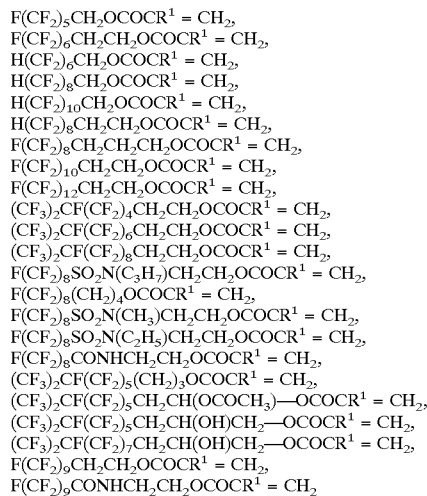

$F(CF_2)_5CH_2OCOCR^1 = CH_2$,
$F(CF_2)_6CH_2CH_2OCOCR^1 = CH_2$,
$H(CF_2)_6CH_2OCOCR^1 = CH_2$,
$H(CF_2)_8CH_2OCOCR^1 = CH_2$,
$H(CF_2)_{10}CH_2OCOCR^1 = CH_2$,
$H(CF_2)_8CH_2CH_2OCOCR^1 = CH_2$,
$F(CF_2)_8CH_2CH_2CH_2OCOCR^1 = CH_2$,
$F(CF_2)_{10}CH_2CH_2OCOCR^1 = CH_2$,
$F(CF_2)_{12}CH_2CH_2OCOCR^1 = CH_2$,
$(CF_3)_2CF(CF_2)_4CH_2CH_2OCOCR^1 = CH_2$,
$(CF_3)_2CF(CF_2)_6CH_2CH_2OCOCR^1 = CH_2$,
$(CF_3)_2CF(CF_2)_8CH_2CH_2OCOCR^1 = CH_2$,
$F(CF_2)_8SO_2N(C_3H_7)CH_2CH_2OCOCR^1 = CH_2$,
$F(CF_2)_8(CH_2)_4OCOCR^1 = CH_2$,
$F(CF_2)_8SO_2N(CH_3)CH_2CH_2OCOCR^1 = CH_2$,
$F(CF_2)_8SO_2N(C_2H_5)CH_2CH_2OCOCR^1 = CH_2$,
$F(CF_2)_8CONHCH_2CH_2OCOCR^1 = CH_2$,
$(CF_3)_2CF(CF_2)_5(CH_2)_3OCOCR^1 = CH_2$,
$(CF_3)_2CF(CF_2)_5CH_2CH(OCOCH_3)-OCOCR^1 = CH_2$,
$(CF_3)_2CF(CF_2)_5CH_2CH(OH)CH_2-OCOCR^1 = CH_2$,
$(CF_3)_2CF(CF_2)_7CH_2CH(OH)CH_2-OCOCR^1 = CH_2$,
$F(CF_2)_9CH_2CH_2OCOCR^1 = CH_2$,
$F(CF_2)_9CONHCH_2CH_2OCOCR^1 = CH_2$

The monomer (f) may contain two or more (meth) acrylates having $R^f$ groups. When it contains two or more (meth)acrylates having $R^f$ groups, they are preferably (meth) acrylates having $R^f$ groups different in the carbon number.

The copolymer (A) contains, in addition to the polymer units based on the monomer (f), polymer units based on a polymerizable monomer (hereinafter referred to also as a monomer (a)) having a hydroxyl group.

The monomer (a) is preferably a polymerizable monomer having at least one hydroxyl group and one or two polymerizable unsaturated groups in its molecule. The monomer (a) is preferably a (meth)acrylic acid ester having a hydroxyl group. Particularly preferred is a monoester of (meth)acrylic acid with a polyhydric alcohol, or a diester of (meth)acrylic acid with a trihydric or higher hydric alcohol.

The polyhydric alcohol may, for example, be ethylene glycol, polyoxyethylene glycol, propylene glycol, polyoxypropylene glycol, a butanediol, a pentanediol, a hexanediol, glycerol, trimethylolpropane, a trimethylolpropane/alkylene oxide adduct, or pentaerythritol.

As a monoester or diester of (meth)acrylic acid with a polyhydric alcohol, a hydroxyalkyl (meth)acrylate or a polyoxyalkylene (meth)acrylate having a terminal hydroxyl group, is preferred. Specifically, 2-hydroxyethyl (meth) acrylate, 2-hydroxypropyl (meth)acrylate, 4-hydroxybutyl (meth)acrylate, a polyoxyalkylene glycol mono(meth) acrylate, a glycerol mono(meth)acrylate, a glycerol di(meth) acrylate, a mono- or di-(meth)acrylate of pentaerythritol, or 3-chloro-2-hydroxypropyl (meth)acrylate is, for example, preferred.

As the monomer (a), a (meth)acrylamide having a hydroxyl group may also be used. Specifically, a methylol-modified diacetone (meth)acrylamide or an N-methylol (meth)acrylamide is, for example, preferred.

The copolymer (B) contains polymer units based on a polymerizable monomer (hereinafter referred to also as a monomer (b)) having an epoxy group, in addition to the polymer units based on the monomer (f). The monomer (b) is preferably a compound having at least one epoxy group and one polymerizable unsaturated group in its molecule. As the monomer (b), a (meth)acrylic acid ester having an epoxy group is particularly preferred. Specifically, glycidyl (meth) acrylate, 3,4-epoxycyclohexylethyl (meth)acrylate or 3,4-epoxycyclohexylmethyl (meth)acrylate may, for example, be mentioned.

The copolymer (A) and the copolymer (B) may contain polymer units based on a polymerizable monomer (hereinafter referred to also as other monomer) other than the monomer (f) and the monomer (a) or (b). As such other monomer, known or well known polymerizable monomers may be mentioned. As such other monomer, a polymerizable monomer having one or two polymerizable unsaturated groups, is preferred, and particularly preferred is a polymerizable monomer having one polymerizable unsaturated group.

The following polymerizable monomers may be mentioned as such other monomer.

An olefin such as ethylene, propylene, butadiene, isoprene, vinyl chloride, vinyl fluoride, vinylidene chloride, vinylidene fluoride or chloroprene, a styrene such as styrene, a-methylstyrene or 4-methylstyrene, a (meth)acrylamide such as diacetone (meth)acrylamide, N,N-dimethyl (meth) acrylamide or N-methylol (meth)acrylamide, a vinyl ether such as ethyl vinyl ether, cyclohexyl vinyl ether or a halogenated alkyl vinyl ether, an allyl ether such as allyl glycidyl ether, a vinyl carboxylate such as vinyl acetate, an allyl carboxylate such as allyl acetate, or a vinyl alkyl ketone such as ethyl vinyl ketone.

An alkyl (meth)acrylate having a $C_{1-26}$ straight chain or branched alkyl group, such as methyl (meth)acrylate, butyl (meth)acrylate, cyclohexyl (meth)acrylate, 2-ethylhexyl (meth)acrylate cetyl (meth)acrylate or octadecyl (meth)acrylate, or a (meth)acrylate such as glycidyl (meth)acrylate, benzyl (meth)acrylate, 2-hydroxyethyl (meth)acrylate, 2-hydroxy-3-chloropropyl (meth)acrylate, a polyoxyalkylene mono(meth)acrylate monomethyl ether, a polyoxyalkylene di(meth)acrylate, 2-(dimethylamino)ethyl (meth)acrylate, a (meth)acrylate having a polydimethylsiloxane group, a (meth)acrylate having a blocked isocyanate group, or a (meth)acrylate having a quaternary ammonium salt.

Triallyl cyanurate, N-vinylcarbazole, maleimide, an N-alkylmaleimide, maleic anhydride, a monoalkyl maleate, or a dialkyl maleate.

The proportion of polymer units based on the monomer (f) in each of the copolymer (A) and the copolymer (B) is preferably from 40 to 99 wt %, particularly preferably from 45 to 80 wt %. The proportion of polymer units based on the monomer (a) in the copolymer (A) is preferably from 1 to 10 wt %, and the proportion of polymer units based on the monomer (b) in the copolymer (B) is preferably from 1 to 10 wt %.

Further, the molecular weight of each of the copolymer (A) and the copolymer (B) is preferably from $10^4$ to $10^6$, particularly preferably from $10^4$ to $10^5$. Further, at the time of producing the copolymer (A) and the copolymer (B), a known molecular weight-controlling agent such as an alkyl mercaptan or a-methylstyrene dimer may be added for the purpose of controlling the molecular weight within the above-mentioned molecular weigh range.

The water dispersion type water and oil repellent composition of the present invention contains the compound (C). The compound (C) is a compound having at least one blocked isocyanate group and having no polymerizable carbon-carbon unsaturated bond, and it is a compound of a structure in which an isocyanate group is blocked with a blocking agent. And, preferred is a structure in which isocyanate groups of a compound obtained by reacting a polyisocyanate with a compound having at least two active hydrogen atoms in its molecule, are blocked with a blocking agent.

As the polyisocyanate, the following polyisocyanates may preferably be mentioned.

An aromatic isocyanate such as 4,4'-diphenylmethane diisocyanate, 2,4'-diphenylmethane diisocyanate or an aliphatic isocyanate or alicyclic isocyanate such as trimethylene diisocyanate, tetramethylene diisocyanate, pentamethylene diisocyanate, hexamethylene diisocyanate, 1,2-propane diisocyanate, 1,2-butane diisocyanate, trimethylhexamethylene diisocyanate, isophorone diisocyanate, 4,4'-dicyclohexylmethane diisocyanate or cyclohexylene diisocyanate, and an isocyanurate-modified product, a prepolymer-modified product, a biuret-modified product or an allophanate modified product thereof.

As the compound having at least two active hydrogen atoms in its molecule, a polyhydric alcohol or a polyvalent amine is preferred. The polyhydric alcohol may, for example, be ethylene glycol, propylene glycol, a butanediol, a pentanediol, a hexanediol, glycerol, trimethylolpropane, pentaerythritol, sorbitol, neopentyl glycol, bisphenol A, xylylene glycol, or a modified product of such an alcohol. The polybasic amine may, for example, be hexamethylenediamine or 3,3'-iminobispropylamine [$H_2NCH_2CH_2CH_2NHCH_2CH_2CH_2NH_2$].

The polyhydric alcohols may be used alone or in combination as a mixture of two or more of them. Further, the polyhydric alcohol may be a polyester polyol. Such a polyester polyol can be obtained by a reaction of a polyhydric alcohol with a polybasic carboxylic acid or a polybasic carboxylic acid derivative and has an ester bond. A polybasic carboxylic acid or its derivative to form the ester bond may, for example, be preferably phthalic acid, adipic acid, fumaric acid, pyromellitic acid, trimellitic acid, an aliphatic dicarboxylic acid or a derivative of such an acid.

The blocking agent for the isocyanate group of the compound (C) is preferably an alkylketoxime, a phenol, an alcohol, a β-diketone or a lactam. Particularly preferred is methyl ethyl ketoxime, ε-caprolactam, phenol, cresol, acetylacetone, diethyl malonate, isopropyl alcohol, t-butyl alcohol or maleic acid imide. Especially preferred is a compound having a dissociation temperature of from 120 to 180° C., such as a dialkylketoxime such as methyl ethyl ketoxime, or a lactam such as ε-caprolactam.

The compound (C) can be obtained, for example, by reacting a polyhydric alcohol to an isocyanate compound, followed by a reaction with a blocking agent. The reaction is preferably carried out in a non-aqueous solvent. As the non-aqueous solvent, a ketone, an ether or a hydrocarbon may be used. Upon completion of all the reactions, the equivalent amounts of the isocyanate compound, the compound having at least two active hydrogen atoms and the blocking agent are preferably equal.

The compound (C) is preferably emulsified by an addition of water and an emulsifier after the above reaction. If necessary, the solvent may be removed after the emulsification.

As the compound (C), a commercially available compound such as Meikanate MF, BP-11, NBP-75, NBP-231 (the foregoing, manufactured by Meisei Kagaku Kogyo K.K.), WB-730, WB-920, XWB-72-Z56 (the foregoing, manufactured by Takeda Chemical Industries, Ltd.), or BI-8 (manufactured by Nippon Polyurethane K.K.) may, for example, be used.

The copolymer (A), the copolymer (B) and the compound (C) are preferably in such a form as dispersed in water. At that time, an emulsifier may be present. As such an emulsifier, a nonionic emulsifier, a cationic emulsifier or an amphoteric emulsifier is preferred, and particularly preferred is a nonionic emulsifier.

The nonionic emulsifier may, for example, be an alkylphenyl polyoxyethylene, an alkylpolyoxyethylene, an alkylpolyoxyalkylene polyoxyethylene, a fatty acid ester, an alkylamine polyoxyethylene, an alkylamide polyoxyethylene, an alkylamine poly(oxyethyleneoxypropylene), or an alkylamine oxide.

The alkylphenyl polyoxyethylene may, for example, be nonylphenyl polyoxyethylene or octylphenyl polyoxyethylene. The alkyl moiety of the alkylpolyoxyethylene may be a $C_{4-26}$ straight chain or branched saturated aliphatic group and may specifically be an octyl group, a dodecyl group, a tetradecyl group, a hexadecyl group, an octadecyl group or a behenyl group.

The alkylpolyoxyalkylene polyoxyethylene may, for example, be an alkylpolyoxypropylene polyoxyethylene or an alkylpolyoxybutylene polyethylene. The alkyl moiety may, for example, be a $C_{4-26}$ straight chain or branched saturated aliphatic group and may specifically be, for example, an octyl group, a dodecyl group, a tetradecyl group, a hexadecyl group, an octadecyl group or a behenyl group. As a specific example, polyoxyethylene octylether, polyoxyethylene octylphenyl ether, (polyoxyethylene)(polyoxypropylene)cetyl ether or polyoxyethylene nonylphenyl ether may be mentioned.

The alkylamine oxide may, for example, be octyldimethylamine oxide or myristyldimethylamine oxide.

The cationic emulsifier may, for example, be an amine salt, a quaternary ammonium salt, an oxyethylene-addition type ammonium hydrochloride. Specifically, a trimethylalkylammonium hydrochloride, a dimethylalkylammonium hydrochloride, a monoalkylamine acetate or an alkylmethyldipolyoxyethylene ammonium hydrochloride, may, for example, be mentioned. As the alkyl moiety, a $C_{4-26}$ saturated aliphatic group is preferred, and specifically, an octyl group, a dodecyl group, a tetradecyl group, a hexadecyl group, an octadecyl group or a behenyl group may, for example, be mentioned. As a specific example, octadecyltrimethylammonium chloride or di(beaf tallow alkyl) dimethylammonium chloride may be mentioned.

The amphoteric emulsifier may, for example, be preferably an alanine, an imidazolinium betaine, an amide betaine or an acetic acid betaine. Specifically, dodecyl betaine, octadecyl betaine, dodecylcarboxymethylhydroxyethylimidazolinium betaine, dodecyldimethylaminoacetic acid betaine, or a fatty acid amide propyldimethylaminoacetic acid betaine may, for example, be mentioned.

Emulsifiers may be used alone or in combination as a mixture of two or more of them. When emulsifiers different in the ionic nature are to be used in combination, a combination of a nonionic emulsifier and a cationic emulsifier or a combination of a nonionic emulsifier and an amphoteric emulsifier, is preferred. Further, the amount of the emulsifier is preferably from 1 to 20 parts by weight, particularly preferably from 3 to 10 parts by weight, per 100 parts by weight of the total amount of the copolymer (A), the copolymer (B) and the compound (C). However, when the copolymer (A) and the copolymer (B) contain polymer units based on a polymerizable monomer having a self emulsifying property, the amount of the emulsifier may be reduced.

The copolymer (A), the copolymer (B) and the compound (C) dispersed in water, are preferably dispersed in water in a particle state. The particle size is preferably from 0.03 to 0.25 $\mu$m. If the particle size is less than 0.03 $\mu$m, a large amount of an emulsifier will be required to obtain a stable dispersion, whereby the water repellency tends to decrease. Further, if it exceeds 0.25 $\mu$m, fine particles tend to precipitate.

The copolymer (A) and the copolymer (B) dispersed in water, may form separate fine particles respectively, or may form fine particles containing the two components in the same particles, like a core/shell type.

As a polymerization method for the copolymer (A) and the copolymer (B), a known or well known polymerization method may be employed. Namely, solution polymerization, emulsion polymerization, suspension polymerization, bulk polymerization, radiation polymerization or photo polymerization may, for example, be employed. Particularly preferred is emulsion polymerization i.e. a method of forcibly emulsifying a mixture of the monomers, followed by polymerization. Further, in a case where other components are present in the same particles, like a core/shell structure, it is preferred to employ seeding polymerization or multi-stage emulsion polymerization wherein polymerization is carried out in multi-stages.

The emulsion polymerization is usually carried out in the presence of a polymerization initiation source. The polymerization initiation source is not particularly limited, and a usual polymerization initiator such as an organic peroxide, an azo compound or a persulfate, or an ionizing radiation such as $\gamma$-ray, may, for example, be employed. Particularly preferred is 2,2'-azobis(2-amidinopropane) dihydrochloride.

The water dispersion type water and oil repellent composition of the present invention contains an amino resin (D). The amino resin (D) is one having a compound having an amino group ($—NH_2$) in its molecule, such as melamine, urea, benzoguanamine or acetoguanamine, methylol-modified ($—CH_2OH$) with formaldehyde, or one having such a compound etherified ($—CH_2OR$) with an alcohol.

As a specific example of such an amino resin (D), a urea resin, a butyrated urea resin, a butyrated urea melamine resin, trimethylolmelamine, hexamethylolmelamine, a melamine resin, a methylated melamine resin, a n-butyrated melamine resin, a methylated n-butyrated melamine resin, an isobutyrated melamine resin, a benzoguanamine resin, a n-butyrated benzoguanamine resin, an isobutyrated benzoguanamine resin, a methylated n-butyrated benzoguanamine resin, an acetoguanamine resin, an alkylated urea resin, an alkylated melamine resin, or an alkylated benzoguanamine resin, may, for example, be mentioned.

The amino resin (D) is preferably soluble in water at room temperature. As a specific example of a watersoluble amino resin (D) which is suitably used for treatment of a fiber product, a melamine resin or a urea resin (Sumitex Resin, tradename, manufactured by Sumitomo Chemical Industries Co., Ltd., Cymel, tradename, manufactured by Mitsui Chemical Co., Ltd.) may, for example, be mentioned.

The water dispersion type water and oil repellent composition of the present invention comprises the copolymer (A), the copolymer (B), the compound (C) and the amino resin (D). The weight ratio of the copolymer (A) to the copolymer (B) is preferably (A)/(B)=10/90 to 90/10, particularly preferably 20/80 to 80/20. Further, relative to 100 parts by weight of the total amount of the copolymer (A) and the copolymer (B), the compound (C) is preferably from 0.5 to 50 parts by weight, and the amino resin (D) is preferably from 0.1 to 5 parts by weight. Further, the solid content concentration is preferably from 0.1 to 10 parts by weight, particularly preferably from 0.5 to 8 parts by weight.

If the ratio of the copolymer (A) or the copolymer (B) is outside the above range, the durability of water and oil repellency or the anti-hydraulic pressure durability against repeated washing tends to decrease. Further, if the content of the compound (C) or the amino resin (D) is too small, no improvement of the durability will be obtained, and if it is too much, the hand and feel of the fibers tend to be hard, or the air permeability tends to be impaired.

The water dispersion type water and oil repellent composition of the present invention may contain a water-soluble lower alcohol for the purpose of improving the permeability into an object to be treated. Further, additives may optionally be incorporated to provide various physical properties to the treated fiber product. The additives may, for example, be other polymer blenders, other water and oil repellent agents, a catalyst to accelerate cross-linking, a hand and feel-adjusting agent, an antistatic agent, a penetrating agent, an insecticide, a flame retardant, an anticrease anti-shrink agent, a dye stabilizer and a pH-controlling agent.

The water dispersion type water and oil repellent composition of the present invention may be diluted to an optional concentration depending upon the purpose or application. And, it is applied to an object to be treated. As an application method to an object to be treated, an optional method is employed depending upon the type of the object to be treated or the formulation of the composition. For example, there is a method wherein it is deposited on the surface of an object to be treated by a coating treatment method such as dipping or coating, followed by drying. Further, if necessary, it is applied together with a suitable crosslinking agent, followed by heat treatment. The heat treating temperature is preferably from 100 to 200° C. It is particularly preferred to carry out heat treatment at a temperature of from 140 to 200° C. in order to accelerate the crosslinking reaction.

The object to be treated by the water dispersion type water and oil repellent composition of the present invention is not particularly limited, and fibers, fiber woven fabrics or fiber knitted fabrics are, for example, preferred.

The fibers may, for example, be animal or plant natural fibers such as cotton, hemp, wool or silk, various synthetic fibers such as polyamide, polyester, polyvinyl alcohol, polyacrylonitrile, polyvinyl chloride or polypropylene, semi synthetic fibers such as rayon or acetate, inorganic fibers such as glass fibers or carbon fibers, or mixed fibers thereof.

The water dispersion type water and oil repellent composition of the present invention is capable of imparting practically excellent water and oil repellency to the fibers. Namely, it is capable of imparting the durability of water and oil repellency and the anti-hydraulic pressure durability against repeated washing, to the fibers.

EXAMPLES

The present invention will be described with reference to Preparation Examples (Examples 1 to 4), Comparative Preparation Examples (Examples 5 to 7), Working Examples (Examples 8, 11 to 13, 16 and 17) and Comparative Examples (Examples 9, 10, 14, 15 and 18 to 21).

Example 1
Preparation of Copolymer (A)

Into a 1 l glass container, 175 g of a perfluoroalkylethyl acrylate [which is $F(CF_2)_m CH_2 CH_2 OCOCH=CH_2$, wherein m is a mixture of 6 to 16, with an average being 9, which will be referred to hereinafter as FA], 15.0 g of dioctyl maleate (DOM), 7.5 g of 2-hydroxyethyl acrylate (HEA), 2.5 g of N,N-dimethylacrylamide (DMAA), 2.5 g of octylmercaptan, 14.0 g of (polyoxyethylene)secondary alkyl ether (BT-15, tradename, manufactured by Nikko Chemicals K.K.), 1.0 g of a betaine acetate aqueous solution (AM-3130N, tradename, manufactured by Nikko Chemicals K.K.), 13 g of propylene glycol and 408 g of deionized water, were introduced. While maintaining this at 60° C., the mixture was emulsified at 200 kg/cm² by means of a high pressure emulsifier (Manton-Gaulin). Then, this was transferred to a 1 l autoclave made of glass, and 1.6 g of 2,2'-azobis(2-amidinopropane) dihydrochloride was added. Then, the autoclave was substituted with nitrogen. After adding 47.5 g of vinyl chloride (VCL), the temperature was raised to 50° C. with stirring to carry out polymerization for 15 hours, to obtain a milky white emulsion. The emulsion had a solid content concentration of 36.5 wt % and a particle size of 0.18 μm. The emulsion was adjusted with deionized water so that the solid content concentration would be 20 wt %, to obtain a latex stock solution.

Example 2
Preparation of Copolymer (A)

The same operation as in Example 1 was carried out except that the polymerizable monomers in Example 1 were changed to 175 g of FA, 20.0 g of DOM, 5.0 g of N-methylolacrylamide (NMAM) and 47 g of VCL, to obtain an emulsion having a solid content concentration of 35.8 wt % and a particle size of 0.15 μm. This was adjusted with deionized water so that the solid content concentration would be 20 wt %, to obtain a latex stock solution.

Example 3
Preparation of Copolymer (B)

Into a 1 l glass container, 120 g of a FA, 60 g of octadecyl acrylate (StA), 20 g of glycidyl methacrylate (GMA), 2 g of dodecylmercaptan, 14 g of (polyoxyethylene)monoalkyl ether, 1 g of octadecyltrimethylammonium chloride, 20 g of tripropylene glycol and 380 g of deionized water were introduced.

While maintaining this at 60° C., it was emulsified at 200 kg/cm² by means of a high pressure emulsifier (Manton-Gaulin). Then, this was transferred to a 1 l autoclave made of glass, and 0.5 g of 2,2'-azobis(2-amidinopropane) dihydrochloride was added. Then, the autoclave was substituted with nitrogen. The temperature was raised to 60° C. with stirring, and polymerization was carried out for 12 hours to obtain a milky white emulsion. The emulsion had a solid content concentration of 34.6 wt % and a particle size of 0.18 μm. The emulsion was adjusted with deionized water so that the solid content concentration would be 20 wt %, to obtain a latex stock solution.

Example 4
Preparation of Copolymer (B)

Into a 1 l glass container, 200 g of a FA, 6.8 g of octadecylmercaptan, 6.3 g of polyoxyethylenenonylphenyl ether and 0.63 g of (a long chain alkyl)dimethylamine acetate [general formula: $RN^+H(CH_3)_2.CH_3COO^-$ wherein R is a $C_{12-13}$ alkyl group], as emulsifiers, 360 g of deionized water and 120 g of tripropylene glycol were introduced. This was preliminarily dispersed by a homogenizer and then emulsified at 400 kg/cm² by means of a high pressure emulsifier (Manton-Gaulin), to obtain a first monomer emulsion.

690 g of this first monomer emulsion was put into a 1 l stainless autoclave, and 2.9 g of azobisisobutyronitrile (AIBN) was added, followed by substitution with nitrogen. After raising the temperature to 70° C., polymerization was carried out for 5 hours to obtain 662 g of a dispersion of first polymer (core) particles having a solid content concentration of 29.0 wt % and an average particle size of 0.075 μm.

Into a 1 l stainless autoclave, 400 g of the dispersion of the first polymer particles (solid content: 116 g; 100 parts by weight) was introduced. As a second polymerizable monomer, a mixture of polymerizable monomers identified with "shell" in Example 4 in Table 1, was introduced thereto in a total amount of 34.8 g (30 parts by weight).

Further, 44.2 g of dipropylene glycol and 132.5 g of deionized water were added, followed by stirring at 45° C. for 1 hour. Thereafter, 0.61 g of 2,2'-azobis(2-amidinopropane) dihydrochloride was added, and after nitrogen substitution, polymerization was carried out at 60° C. for 15 hours. After cooling, the aqueous solvent dispersion had a solid content concentration of 21.0 wt % and an average particle size of 0.145 μm. The aqueous solvent dispersion was adjusted with deionized water so that the solid content concentration would be 20 wt %, to obtain a latex stock solution.

Example 5 to 7

By the same operation as in Example 1 except that the composition of the charged polymerizable monomers was changed as shown in Table 1, an emulsion was prepared, and a latex stock solution was obtained.

TABLE 1

| Example | Polymerizable monomers (parts by weight) | Type of copolymer |
|---|---|---|
| 1 | FA/VCL/DOM/DMAA/HEA (71/19/6/1/3) | (A) |
| 2 | FA/VCL/DOM/NMAM (71/19/8/2) | (A) |
| 3 | FA/StA/GMA (60/30/10) | (B) |
| 4 | FA (100) [core]-FA FA/CHMA/GMA (60/30/10) [shell] | (B) |
| 5 | FA/VCL/DOM (70/22/8) | — |
| 6 | FA/STA (60/40) | — |
| 7 | FA/VCL/DOM/NMAM/GMA (70/20/6/2/2) | — |

CHMA: Cyclohexyl methacrylate

Examples 8 to 14

Using the latex stock solutions prepared in Examples 1 to 7, formulation was carried out in the proportions (unit: wt %) as shown in Tables 4 and 5, to obtain treating solutions.

A nylon taffeta cloth was dipped in the treating solution prepared as described above, and the cloth was squeezed between a pair of rubber rollers to a wet pick up of 60 wt %. Then, it was dried at 110° C. for 90 seconds and further heat-treated at 170° C. for 60 seconds. With respect to the nylon taffeta cloth after the treatment, the water repellency, the oil repellency and the hydraulic pressure resistance were evaluated by the following methods. Further, for the durability test (represented by HL80) of the test cloth, evaluation was carried out with respect to the one which was washed 80 times repeatedly by the method of separate table 103 of JIS L0217 and dried by hot air at 70° C. for 3 minutes. The results are shown in Tables 4 and 5.

Evaluation of Water Repellency

The evaluation was carried out by a spray test of JIS L1092 (wherein the amount of water sprayed was set to be 1000 ml, and the temperature of the water was set to be 27° C.) and represented by the water repellency grade as shown in Table 2. The symbol +(−) attached to the water repellency grade indicates that the respective performance was slightly better (worse) than the particular grade.

TABLE 2

| Water repellency grade | State |
|---|---|
| 100 | No wetting observed on the surface |
| 90 | Slight wetting observed on the surface |
| 80 | Partial wetting observed on the surface |
| 70 | Substantial wetting observed on the surface |
| 50 | Wetting observed over the entire surface |
| 0 | Complete wetting observed over both surfaces |

Evaluation of Oil Repellency

The evaluation was carried out in accordance with AATCC-TM118-1966 and represented by the oil repellency grade as shown in Table 3. The larger the oil repellency grade, the better the oil repellency.

TABLE 3

| Oil repellency grade | Test liquid | Surface tension (dyn/cm at 25° C.) |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | 65 Parts of nujol/35 parts of hexadecane | 29.6 |
| 1 | Nujol | 31.2 |
| 0 | Less than 1 | — |

Evaluation of Hydrostatic Pressure Resistance

The evaluation was carried out by (a) hydrostatic pressure method in accordance with method A for water resistance degree (low hydrostatic pressure method) of

TABLE 4

| | | Examples | | | | | | | |
|---|---|---|---|---|---|---|---|---|---|
| | | 8 | 9 | 10 | 11 | 12 | 13 | 14 | 15 |
| Fluorine-containing copolymer (A) | Type | Ex. 1 | Ex. 1 | Ex. 1 | Ex. 1 | Ex. 1 | Ex. 1 | — | Ex. 1 |
| | Amount | 3 | 3 | 3 | 3 | 2 | 4 | 0 | 6 |
| Fluorine-containing copolymer (B) | Type | Ex. 3 | Ex. 3 | Ex. 3 | Ex. 4 | Ex. 4 | Ex. 4 | Ex. 4 | — |
| | Amount | 3 | 3 | 3 | 3 | 4 | 2 | 6 | 0 |
| Takenate (C) | | 1.5 | 1.5 | 0 | 1.5 | 1.5 | 1.5 | 1.5 | 1.5 |
| Resin M3 (D) | | 0.3 | 0 | 0.3 | 0.3 | 0.3 | 0.3 | 0.3 | 0.3 |
| Catalyst ACX | | 0.3 | 0 | 0.3 | 0.3 | 0.3 | 0.3 | 0.3 | 0.3 |
| Deionized water | | Rest | Rest | Rest | Rest | Rest | Rest | Rest | Rest |
| Initial water repellency | | 100 | 100 | 100 | 100 | 100 | 100 | 100 | 100 |
| Initial oil repellency | | 6 | 6 | 6 | 6 | 6 | 6 | 6 | 6 |
| Initial hydrostatic pressure resistance | | 350 | 270 | 345 | 355 | 355 | 320 | 330 | 325 |
| HL80 water repellency | | 90 | 90 | 70+ | 90+ | 90+ | 90 | 80− | 80 |
| HL80 oil repellency | | 5 | 5 | 3 | 5 | 5 | 5 | 5 | 3 |
| HL80 hydrostatic pressure resistance | | 290 | 100 | <50 | 305 | 285 | 280 | 240 | 200 |

TABLE 5

| | | Examples | | | | | |
|---|---|---|---|---|---|---|---|
| | | 16 | 17 | 18 | 19 | 20 | 21 |
| Fluorine-containing copolymer (A) | Type | Ex. 2 | Ex. 2 | Ex. 1 | Ex. 2 | Ex. 2 | — |
| | Amount | 3 | 3 | 3 | 3 | 3 | |
| Fluorine-containing copolymer (B) | Type | Ex. 3 | Ex. 4 | — | — | Ex. 4 | — |
| | Amount | 3 | 3 | | | 3 | |
| Fluorine-containing copolymer | | — | — | Ex. 5 | Ex. 6 | — | Ex. 7 |
| | | | | 3 | 3 | | 6 |
| Takenate (C) | | — | — | 1.5 | 1.5 | — | 1.5 |
| Meikanate (C) | | 1.5 | 1.5 | — | — | — | — |
| Resin M3 (D) | | — | — | 0.3 | 0.3 | 0.3 | 0.3 |
| Resin M6 (D) | | 0.5 | 0.5 | — | — | — | — |
| Catalyst ACX | | 0.3 | 0.3 | 0.3 | 0.3 | 0.3 | 0.3 |
| Deionized water | | Rest | Rest | Rest | Rest | Rest | Rest |
| Initial water repellency | | 100 | 100 | 100 | 100 | 100 | 100 |
| Initial oil repellency | | 6 | 6 | 6 | 6 | 6 | 6 |
| Initial hydrostatic pressure resistance | | 360 | 345 | 285 | 290 | 270 | 290 |
| HL80 water repellency | | 90 | 90 | 80− | 70+ | 70+ | 80− |
| HL80 oil repellency | | 5 | 5 | 3 | 3 | 2+ | 3 |
| HL80 hydrostatic pressure resistance | | 300 | 305 | 255 | 240 | 210 | 250 |

The abbreviation in Tables 4 and 5 are as follows.

Takenate: Blocked isocyanate emulsion ("Takenate XWB-72-Z56", tradename, manufactured by Takeda Chemical Industries, Ltd.), Meikanate: Blocked isocyanate emulsion ("Meikanate MF", trade name, manufactured by Meisei Kagaku K.K.), Resin M3: Melamine resin ("Sumitex Resin M3", tradename, manufactured by Sumitomo Chemical Co., Ltd.), Resin M6: Melamine resin ("Sumitex Resin M6", tradename, manufactured by Sumitomo Chemical Co., Ltd.), Catlyst ACX: Amine salt type catalyst ("Sumitex Accelerator ACX", tradename, manufactured by Sumitomo Chemical Co., Ltd.

What is claimed is:

1. A water dispersion of water and oil repellent composition comprising the following copolymer (A), the following copolymer (B), the following compound (C) and an amino resin (D):

Copolymer (A): a copolymer having polymer units based on a polymerizable monomer having a hydroxyl group and polymer units based on a polymerizable monomer having a polyfluoroalkyl group;

Copolymer (B): a copolymer having polymer units based on a polymerizable monomer having an epoxy group and polymer units based on a polymerizable monomer having a polyfluoroalkyl group; and Compound (C): a compound having a blocked isocyanate group and no polymerizable carbon-carbon unsaturated bond.

2. The water dispersion of water and oil repellent composition according to claim 1, wherein fine particles of the copolymer (A), fine particles of the copolymer (B) and fine particles of the compound (C) are dispersed in an aqueous medium, and the amino resin (D) is dissolved in the aqueous medium.

3. The water dispersion of water and oil repellent composition according to claim 1, wherein the weight ratio of the copolymer (A) to the copolymer (B) is (A)/(B)=20/80 to 80/20, and relative to the total amount of the copolymer (A) and the copolymer (B), the compound (C) is from 0.5 to 50 wt % and the amino resin (D) is from 0.1 to 5 wt %.

4. A fiber treated with the water dispersion of water and oil repellent composition as defined in claim 1.

5. The water dispersion of water and oil repellent composition according to claim 2, wherein the weight ratio of the copolymer (A) to the copolymer (B) is (A)/(B)=20/80 to 80/20, and relative to the total amount of the copolymer (A) and the copolymer (B), the compound (C) is from 0.5 to 50 wt % and the amino resin (D) is from 0.1 to 5 wt %.

* * * * *